United States Patent [19]

Onozawa

[11] Patent Number: 4,675,679
[45] Date of Patent: Jun. 23, 1987

[54] DIGITAL SCAN CONVERTER

[75] Inventor: Kazuo Onozawa, Tokyo, Japan

[73] Assignee: Oki Electric Industry Co., Ltd., Tokyo, Japan

[21] Appl. No.: 805,384

[22] Filed: Dec. 4, 1985

[30] Foreign Application Priority Data

Dec. 5, 1984 [JP] Japan ................................ 59-255750

[51] Int. Cl.⁴ ............................................. H04N 7/01
[52] U.S. Cl. ..................................... 342/185; 358/140
[58] Field of Search ................. 342/185, 195; 358/140

[56] References Cited

U.S. PATENT DOCUMENTS

| 3,765,018 | 9/1973 | Heard et al. | 342/185 |
| 4,358,789 | 11/1982 | Confer | 358/140 |
| 4,567,506 | 1/1986 | Shinoda et al. | 358/140 |
| 4,577,225 | 3/1986 | Pritchard | 358/140 |
| 4,580,163 | 4/1986 | Hartmeier | 358/140 |
| 4,580,164 | 4/1986 | Andrieu et al. | 358/140 |
| 4,587,557 | 5/1986 | Doornhein et al. | 358/140 |
| 4,598,314 | 7/1986 | Reimers | 358/140 |

Primary Examiner—Thomas H. Tarcza
Assistant Examiner—Donald E. Hayes, Jr.
Attorney, Agent, or Firm—Wenderoth, Lind & Ponack

[57] ABSTRACT

A digital scan converter comprises an A/D converter; an input buffer; a random access memory; a write address generator; a plurality of read address generators; an address switch circuit composed of a first address switch means for switching the addresses from the write address generator and the read address generators and delivering the addresses via an address signal line to the random access memory, and alternately switching a first address signal line for transmitting the address from the write address generator and a common signal line for commonly transmitting the addresses from the plurality of the read address generators for connecting one of said switched lines with the address signal line, and a second switch means for switching in succession the connection between the common signal line and a plurality of second signal lines respectively connected with the plurality of the read address generators for transmitting the addresses; a plurality of output buffer; an output switch circuit having a third switch means cooperating with the second switch means for switching the connection between the first data line for transmitting the digital data from the random access memory and the plurality of the second data lines for transmitting the digital data to the output buffers, the output switch circuit being adapted to receive the digital data from the random access memory and switch the connections from the output switch circuit to the plurality of the output buffers; and a plurality of D/A converters.

10 Claims, 6 Drawing Figures

DIGITAL SCAN CONVERTER

IBACKGROUND OF THE INVENTION

1. Field of the Invention:

The present invention relates to a device for converting a video data with a particular scan rate supplied from a radar receiver or other sources to a video data with a different scan rate.

2. Description of the Prior Art:

A digital scan converter receives a slow scan rate video data available from a radar receiver and converts it to a high scan rate video data and displays the resultant video data on a television or an orthogonal display. A prior example of a digital scan converter is disclosed in U.S. Pat. No. 3,765,018.

Figure 1:
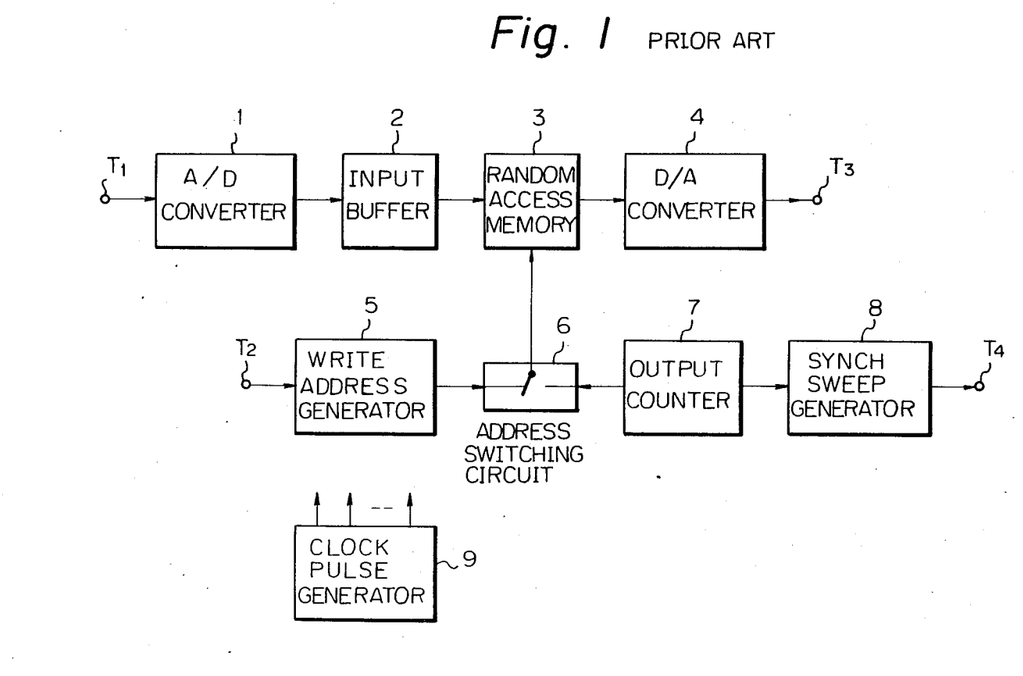
FIG. 1 is a block diagram showing the constitution of a prior digital scan converter.

FIG. 1 is a block diagram illustrating an examplary arrangement of a prior digital scan converter. As shown in the figure, an analog input video signal from an input terminal T1 is converted to a digital signal by an analog-to-digital converter 1 (hereinafter simply referred to as A/D converter), and stored temporarily in an input buffer 2. An azimuth data from an input terminal T2 is converted in a write address generator 5 to X-Y coordinates, and transferred to a X-Y coordinate random access memory 3 via an address switching circuit 6. The video signal temporarily stored in an input buffer 2 is read out synchronized with an address data from the write address generator 5, transferred to the random access memory 3, and stored in the address. For the video signals stored in the memory 3, read scanning address data prepared in an output counter 7 is supplied to the memory 3 via the address switching circuit 6, and the video signal corresponding to the read scanning address data is read out of the memory 3 in succession in conformity with prescribed read scanning. The read video signal is converted to a digital signal through a D/A converter 4, and delivered to an output terminal T3. Thus, with the input video signal scanned in polar coordinates (R,θ), the signal is converted to a read scan specified by the output counter 7 (for example, a rectangular coordinate (X, Y) scan).

As described above, in the prior digital scan converter, the video signal thus scanned and converted is read out only from a region of one kind of the memory 3 (the whole region of the memory 3, in typical). Accordingly, for the prior video signal, only a picture image present in the region of one kind is displayed on a display (for example, on a TV display). In a harbor radar system, etc., picture images available from one radar or picture images from a plurality of radars may be synthesized into one system, and scan-converted and displayed simultaneously on a plurality of displays for every different regions. For this reason, in such a case, scan converters corresponding to the displays in the number thereof are required from the above described reason.

SUMMARY OF THE INVENTION

It is an object of the present invention to provide an improved digital scan converter in which video signals from a plurality of different regions can be respectively scanconverted, and displayed on a display simultaneously in parallel.

According to the present invention, a digital scan converter for converting video signals provided at a specific scan rate to video signals scanned at different scan rates comprises; an A/D converter for converting an input video signal to a digital data; an input buffer for receiving and storing the digital data therein; a random access memory for receiving the digital data from the input buffer and allowing the data to be written therein; a write address generator for preparing addresses which designate positions in the random access memory of the digital data to be written; a plurality of read address generator for generating an address for reading the digital data written in a desired region of the random access memory; an address switch circuit composed of a first address switch means for switching the addresses from the write address generator and the read address generator and delivering the addresses via an address signal line to the random access memory, and alternately switching a first address signal line for transmitting the address from the write address generator and a common signal line for commonly transmitting the addresses from the plurality of the read address generator for connecting one of said switched lines with the address signal line, and a second switch means for switching in succession the connection between the common signal line and a plurality of second signal lines respectively connected with the plurality of the read address generator for transmitting the address in which switch operation of the second switch means is effected while the first switch means connects the first signal line with the address signal line; a plurality of output buffer provided respectively corresponding to the plurality of the read address preparation means for receiving and storing the digital data read out of the random access memory an output switch circuit having a third switch means cooperating with the second switch means for switching the connection between the first data line for transmitting the digital data from the random access memory and the plurality of the second data lines for transmitting the digital data to the output buffer, said output switch circuit being adapted to receive the digital data from the random access memory and switch the connections from the output switch means to the plurality of the output buffers; and a plurality of D/A converter respectively provided for the plurality of the output buffer for receiving the digital data from the output buffer and converting the received digital data to analog video signals for their deliveries.

The above and other objects, features and advantages of the present invention will become more apparent from the following description when taken in conjunction with the accompanying drawings in which a preferred embodiment of the present invention if shown by way of illustrative example.

DESCRIPTION OF THE PREFERRED EMBODIMENT

Figure 2A:
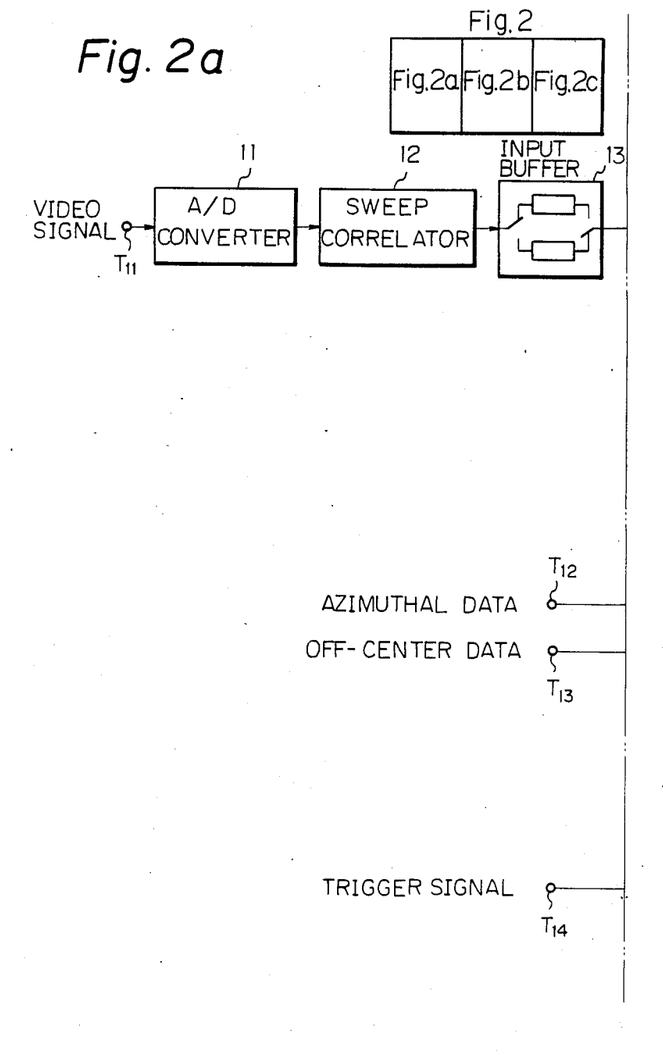
FIG. 2 is a block diagram showing the constitution of a digital scan converter according to the present invention.
Figure 2B:
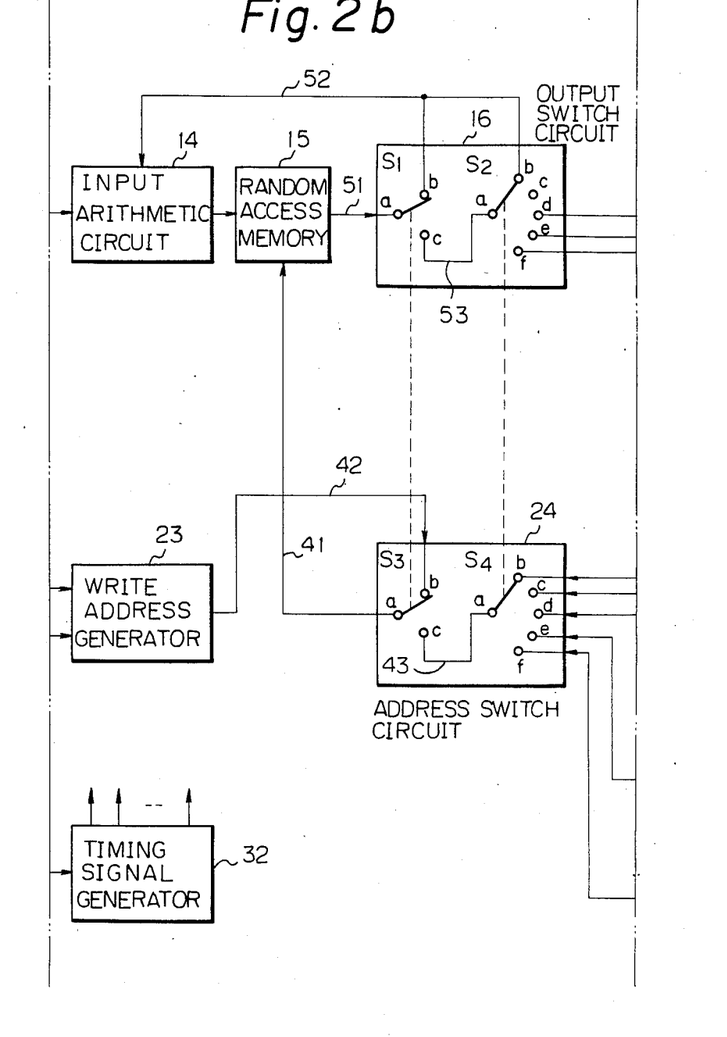
Figure 2C:
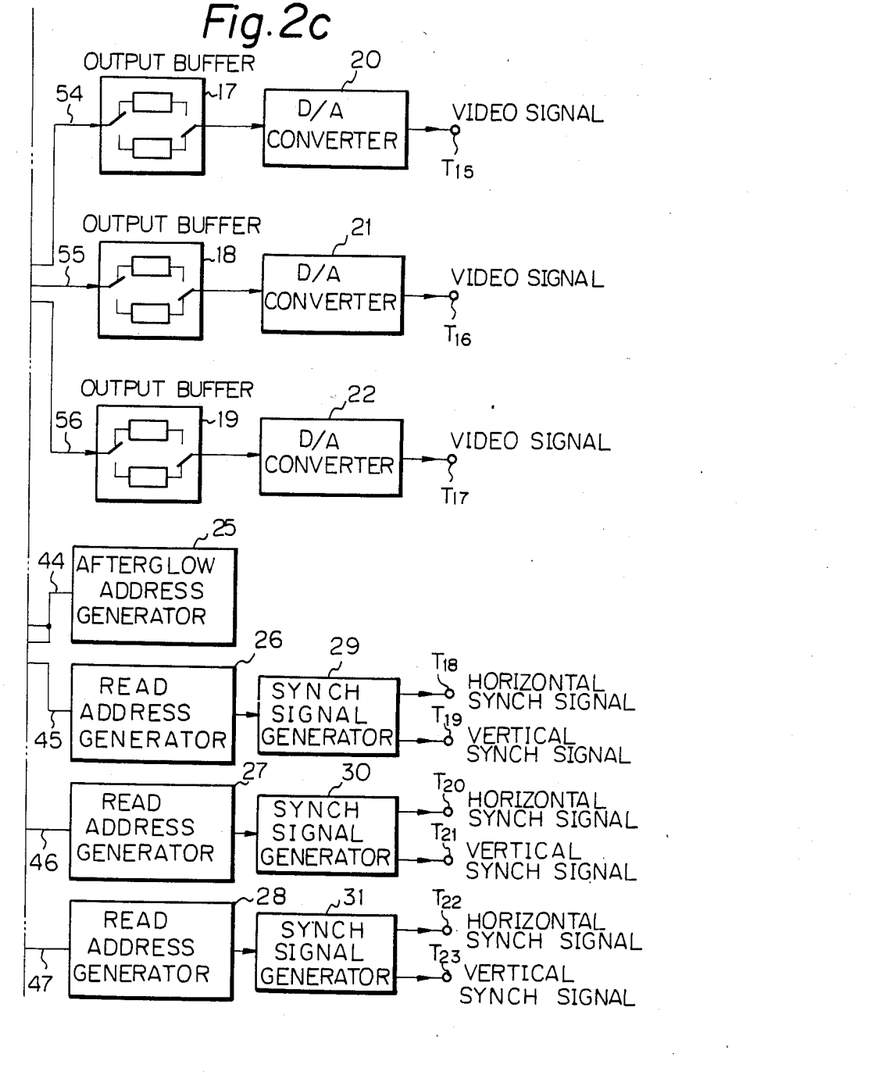

A digital scan converter of an embodiment according to the present invention has the constitution shown in FIG. 2.

As shown in FIG. 2, input terminals $T_{11}$, $T_{12}$, $T_{13}$, and $T_{14}$ are respectively used for a video signal, an azimuth data, an off-center data, and a trigger signal which are available from polar coordinate scanning of a radar.

A video signal inputted from the input terminal $T_{11}$ is converted to multi-valued digital video signals for every quantized distance ($\Delta r$) by an A/D converter 11, and transferred to a sweep correlator 12.

The sweep correlator 12 receives a digital video signal from an A/D converter 11. The sweep correlator further receives a signal from a timing signal generator 32 which receives a trigger signal supplied from the input terminal T14 and delivers triger signals to respective succeeding circuits. The sweep correlator 12 effects sweep correlation processing based on said trigger signal whereby the video signal divided in the same distance is swept and added in the prescribed number of times, and delivers the above video signals subjected to the sweep correlation processing by one sweep at a time every time the prescribed number trigger signals are inputted to the sweep correlator 12 and delivers them to an input buffer 13. The prescribed number of times is selected to be an integer less than the hit number by the radar and a value enabling in time the digital video signal to be written in a random access memory. The input buffer 13 comprises two line memories, which receives one sweep of the digital video signal subjected to the sweep correlation processing from the sweep correlator 12, and stores the one sweep's digital video signal in one of the two line memories and thereafter alternately stores the signal in the line memories. The other line memory not just serving to store the data delivers the stored digital video signals to an input arithmetic circuit 14 in the order and at a prescribed rate different from that as they are inputted. The input arithmetic circuit 14 receives the digital video signal available from the input buffer 13 and the digital video signal available from an output switch circuit 16 via a data line 52. Further, the input arithmetic circuit 14 effects arithmetic operation between the above two digital video signals (e.g., comparison of the magnitudes thereof) in an operation time (ta) within a period for writing ($t_w$) in a picture element (memory element) of the random access memory 15, while effects arithmetic operation (e.g., attenuation operation for afterglow) for the digital video signal available from the output switch circuit 16 in a period of afterglow readout and operation ($t_{AR}$). Thereafter, the input arithmetic circuit 14 delivers the operated digital video signal to the random access memory 15. The random access memory 15 comprises X-Y coordinate memory elements and a memory control circuit, in which the digital video signal from the input arithmetic circuit 14 is written in conformity with a write address data available from the address switch circuit 24 via an address signal line 41. The random access memory 15 further delivers the stored digital video signal to the output switch circuit 16 via the data line 51 according to the read address data available from the address switch circuit 24 via an address signal line 41. The output switch circuit 16 has a switch $S_1$ and a switch $S_2$ therein, which operates interlocking with the address switch circuit 24, receives the video signal read from the random access memory 15. Thereafter, the output switch circuit 16 switches the received signal to deliver the signal to the input arithmetic circuit 14 via the data line 52 and to the output buffers 17, 18, 19 via data lines (54), (55), (56). The output buffers (17), (18) and (19) respectively comprise two line memories. The output buffer (17) receives the video signal from the output switch (16), which is alternately stored in a parallel manner in one of the two memories. Further, the video signals stored in the one line memory whose storage operation has been complete are successively read out in series at a prescribed rate, and transferred to D/A conversters (20), (21), and (22). The D/A converters (20), (21) and (22) respectively receive the video signals transferred from the output buffers (17), (18) and (19), and D/A convert them to analog video signals to deliver them to output terminals ($T_{15}$), ($T_{16}$), and ($T_{17}$). A write address generator (23) receives an azimuthal data and an off-center data respectively from the input terminals ($T_{12}$) and $T_{13}$), and converts respective positions of the azimuthal data located in the direction of the azimuthal data (direction of sweep) to the same X-Y coordinates as those of the coordinate system of the memory (15) toward a larger distance in order from an off-center position by the quantized distance ($\Delta r$) at a time. The write address pnerator (23), an afterglow address generator (25) further prepares X-Y coordinate address so as to allow the above converted X-Y coordinates to correspond to the video signal supplied from the input buffer (13), and delivers the resultant address data to the address switch circuit (24) via a signal line (42). The address switch circuit (24) receives the address data respectively supplied from the write address generator (23), the afterglow address generator (25) and read address generator (26), (27) and (28) via the signal line (42) and signal lines (44,) (45), (46) and (47), and switches these data to the random access memory (15). The address switch circuit (24) has therein switches ($S_3$) and ($S_4$) which conduct the same switch operation interlocking with the output switch circuit (16). The switch operation is effected in two periods $1(T_1)$ and $2(T_2)$. The first half of the period 1 is assigned to a write period ($t_w$) into a picture element in which respective terminals a and b of the switch $S_3$ in the address switch circuit 24 and the switch $S_1$ in the output switch circuit 16 are connected with each other, while in the latter half ($T_1-t_w$) of the period 1 the respective terminals a and c of the switch $S_3$ and the switch $S_1$ are connected with each other. The respective terminals a of the switch $S_4$ in the address switch circuit 24 and the switch $S_2$ of the output switch circuit 16 are switched for every period 1 to the respective terminals b, c, d, e, and f of the above switch circuits, and these switch operations are complete to the last half of the period 1. The terminal a of the switch $S_4$ is connected with the terminal c of the switch $S_3$ via a common signal line 43, while the terminal a of the switch $S_2$ connected with the terminal c of the switch $S_1$, via a common data line 53. With the lapse of five periods of the period 1, the operation is again repeated, and a period of the repetition to the period 2 ($T_2=5 \times T_1$). The afterglow address generator 25 prepares and address for reading out a video signal stored in a picture element of the memory to effect arithmetic operation for estimating the afterglow of a fluorescent screen of an output display and again storing the video signal in the same address in order to attenuate the video signal stored in the random access memory 15 successively in time so as to provide an afterflow image characteristic of the video signal available from the output terminals $T_{15}$, $T_{16}$ and $T_{17}$ on the screen upon displaying it. Namely, the afterglow address generator 25 prepares an address data for X-Y scanning a prescribed region (typically, the whole region) of the random access memory 15 at a prescribed rate, and delivers the address data to the address switch circuit 24 via the signal line 44. The read address generators 26, 27 and 28 respectively prepare addresses for reading video signals stored in the random access memory circuit 16 with a prescribed scanning mode (X-Y scanning in the present embodiment) for prescribed regions of the memory and timing signals corresponding to the above addresses, and transmit the address data to the address switch circuit 24 and the timing signals corresponding to the above addresses to synch signal generators 29, 30 and 31. The synch signal generators 29, 30 and 31 respectively receive the timing signals corresponding to the addresses from the read address generator 26, 27 and 28 generate analog synch signals for allowing the video signals to be displayed respectively with prescribed scanning. The synch signal generators further deliver a horizontal synch signal to the output terminals $T_{18}$, $T_{20}$ and $T_{22}$, and a vertical synch signal to the output terminals $T_{19}$, $T_{21}$ and $T_{23}$, respectively. The timing signal generator 32 receives a trigger signal from the input terminal $T_{14}$, and generates timing signals required for the respective circuits to deliver them to the respective circuits.

Figure 3:
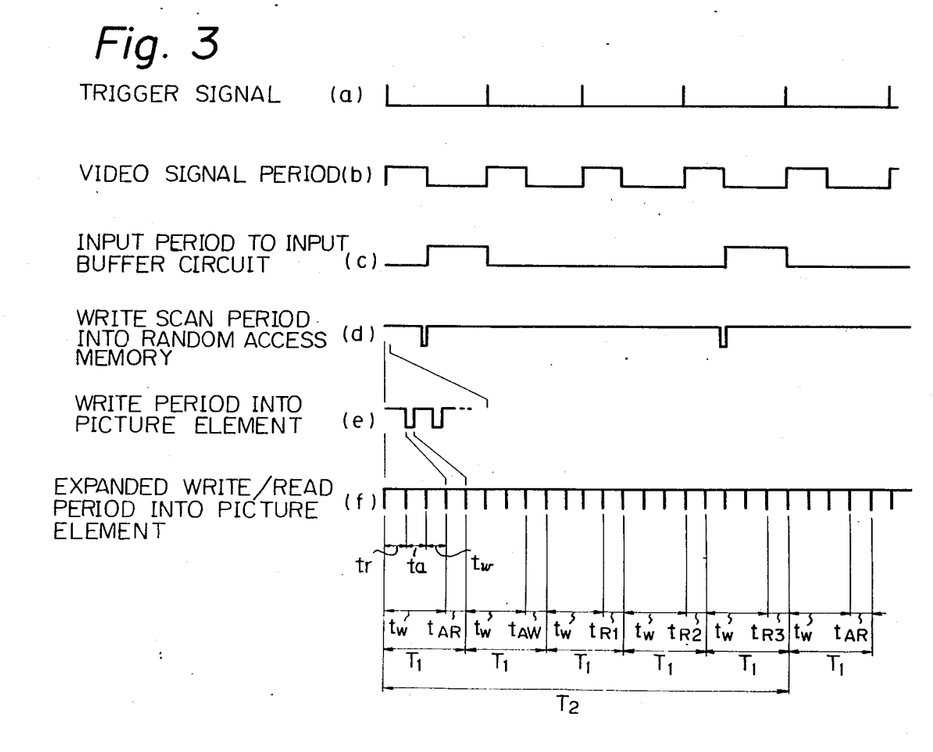
FIG. 3 shows a timing chart of the digital scan converter accodring to the present invention.

FIG. 3 is a timing chart showing a timing relationship for illustrating the operation of the embodiment of the digital scan converter according to the present invention of FIG. 2. The same figure (a) shows a trigger signal available from the terminal $T_{14}$, (b) an input period of a video signal available from the terminal $T_{11}$ (a high level corresponds, the same shall apply hereinafter), (c) an input period of a digital video signal to the input buffer 13, (d) a write scanning period to the random access memory 15, (e) a write period in the picture element of the random access memory 15, and (f) an enlarged view illustrating the above write period to the picture element and a read period from the picture element, etc., wherein $t_r$ shows a read time, $t_a$ an input operation time, $t_w$ a write period, $t_W$ a write period into a picture element which is equal to the sum of the above three times, $t_{AR}$ an afterglow read/arithmetic operation period, $t_{AW}$ an afterglow write period, $t_{R1}$, $t_{R2}$ and $t_{R3}$ respectively read periods, $T_1$ the period 1, and $T_2$ the period 2.

Figure 4:
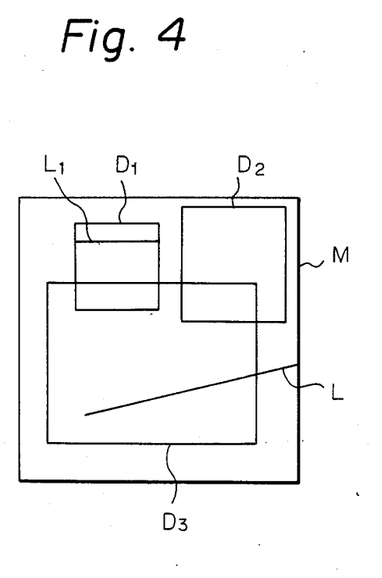
FIG. 4 is a view illustrating a relationship bewteen a storage area on a random access memory and a scanning region of an address data prepared in each of the address preparation circuits.

FIG. 4 shows a scanning region on the random access memory for illustrating operation of the embodiment of the digital scan converter of the digital scan converter of the present invention of FIG. 2, wherein M shows a storage region of the random access memory 15, $D_1$, $D_2$ and $D_3$ respectively scanning regions of address data generated in the read address generators 26, 27 and 28, L a write scanning line on the random access memory 15 at certain time, and $L_1$ likewise a read scanning line of an address data from the read address generator 26 at certain time.

An shows an operation of the embodiment of the digital scan converter according to the present invention of FIG. 2 is as follows.

A video signal from a radar receiver is converted by the A/D converter 11 from an analog signal to a digital signal, and a signal-to-noise ratio of the above signal is improved in proportional to the number of sweep correlation times by the sweep correlator 12. Thereafter, the digital signal is transferred at every triggers of the prescribed times by one sweep to the input buffer 13. In the write period ($t_W$) into a picture element in the first cycle of the period 1, the respective terminals a and the respective terminals b of the switchs $S_3$ of the address switch circuit 24 and the switchs $S_1$ of the output switch circuit 16 are respectively connected.

In the read time $t_r$ within the write period ($t_w$) into the picture element, an address data is supplied from the write address generating means 23 to the random access memory 15 via the signal line 42 and the address signal line 41, and a digital video signal stored in a picture element position corresponding to the address data is read and supplied to the input arithmetic circuit 14 via the data lines 51, 52. In the input operation time $t_a$ succeeding to the read time $t_r$, the digital video signal read from the input buffer 13 and the digital video signal supplied via the data lines 51, 52 are compared with each other in the magnitudes thereof in the input arithmetic circuit 14, and a larger digital video signal therebetween is given as the result of the arithmetic operations. In the write time $t_w$ succeeding to the input arithmetic operation time $t_a$, the digital video signal given as the operation result is supplied from the input arithmetic circuit 14 to the random access memory 15, and written in a picture image position corresponding to the address data from the write address generating circuit 23.

Then, in the afterglow/arithmetic operation period ($t_{AR}$) in the first cycle of the period 1, the respective terminals a and the respective terminals b of the switch $S_3$ of the address switch circuit 24 and the switch $S_1$ of the output switch circuit 16 are respectively connected terminals a and the respective terminals b of the switch $S_4$ of the address switch circuit 24 and the switch $S_2$ of the output switch circuit 16 respectively connected. Further, an address data from the afterglow address generator 25 is supplied to the random access memory 15 via the signal line 44, common signal line 43, and address signal line 41, and a digital video signal stored in a picture element position in correspondence with the address data is read out and supplied to the input arithmetic circuit 14 via the data line 51, common data line 52, and data line 53. In addition, the input arithmetic circuit 14 effects arithmetic operation for afterglow for the supplied digital video signal.

In the write period ($t_w$) into a picture element in the succeeding second cycle of the period 1, the respective terminals a and the respective terminal b of the switches $S_3$ and $S_1$ are again connected with each other, and the next video signal is written into the picture element of the random access memory 15 from the input buffer 13. In the second cycle afterglow write period ($t_{AW}$), the respective terminals a and the terminals c of the switches $S_3$ and $S_1$ are connected, while the respective terminals a and the respective terminals c of the switches $S_4$ and $S_2$ connected. Provided that the address data from the afterglow generator 25 is made to keep the same value as that in the previous cycle, the operated digital video signal is written in the picture element from which the digital video signal is read out (read/write operation for the afterglow is simultaneously effected in parallel to the afterglow for a plurality of picture elements in the X direction). In the write period ($t_w$) into a picture element of the third, fourth, and fifth cycles of the period $T_1$, the respective terminals a and the respective terminal b of the switches $S_3$ and $S_1$ are connected with each other, and the same operation of that within the write period ($t_w$) into a picture element up to the second cycle is effected. Further, in the read periods ($t_{R1}$, $t_{R2}$, $t_{R3}$), the respective terminals a and the respective terminals b the switches $S_3$ and $S_1$ are connected. Further, in the above periods, the respective terminals a and the respective terminals d, e, f of the switches $S_4$ and $S_2$ are successively connected, and video signals of a picture elements of the random access memory 15 corresponding to address data generated in the read address generators 26, 27 and 28 are read out and respectively delivered to the output buffers 17, 18 and 19. The above operation is likewise repeated.

The above read/write operation from picture elements in the above afterglow read/arithmetic operation period ($t_{AR}$) and in the read periods ($t_{R1}$, $t_{R2}$, $t_{R3}$) from the picture elements are simultaneously effected for a plurality of the picture elements of the proper number in parallel.

Here, the number of picture elements in the X direction of the random access memory 15 read in parallel and simultaneously in correspondence with address data generated in the address generators 26, 27, and 28 is selected to be respectively equal to the number of picture elements scanned during the period $2(T_2)$ upon successively scanning respective scanning regions with prescribed rates. Then, analog video signals read from the output buffers 17, 18, and 19 with prescribed rates, converted from digital video signals to analog video signals by the D/A converter 20, 21, and 22, and available from the output terminals $T_{15}$, $T_{16}$, and $T_{17}$ are respectively displayed in X-Y scanning by horizontal synch signals available from the output terminals $T_{18}$, $T_{20}$, and $T_{22}$ and by vertial synch signals available from the output terminals $T_{19}$, $T_{21}$, and $T_{23}$. With the arrangement described above, regions on the display screen corresponding to respective prescribed regions on the random access memory 15 scanned by the read address generators 26, 27, and 28 can be made to be display regions, and continuous picture images can be obtained in the display regions. In such a way, in the above embodiment video signals on a plurality of different regions can be respectively scan-converted, and simultaneously outputted.

In this embodiment, three kinds of video signals are respectively scan-converted for different region. However, the kinds of video signals can be increased or decreased by adjusting the number of the read address generating means, output buffers, digital-to-analog converters, and synch signal generators.

Further, in this embodiment, arithmetic operation between a video signal written in the random access memory 15 and that stored in the random access memory 15, and arithmetic operation for providing adjusted afterglow on a display screen for a stored video signal can be effected with use of the input arithmetic circuit 14. Accordingly, functional display of a scan converted video signal can be achieved. But, in the instance, the input arithmetic circuit 14 and the afterglow address generator 25 can be removed for directly connected between the input buffer 13 and the random access memory 15. Although in this case, the above described two kinds of the arithmetic operation can not be effected, video signals respectively scan-converted for a plurality of different regions are available simultaneously. Operation in the instance is as follows. A connection for delivering a video signal available from the output switch circuit 16 to the input arithmetic circuit 14 is opened. Switch operation between the output switch circuit 16 and the address switch circuit 24 is made the same as that before. Although in the read time ($t_r$) within the write period ($t_w$) into a picture element, contents of the random access memory 15 are read out, in the input arithmetic operation time ($t_a$) the operation is not effected. In the write time ($t_w$), the video signal from the input buffer 13 is written in an address available from the write address generating circuit 23 through the address switch circuit 24. In the afterglow read and operation time ($t_{AR}$) and in the afterglow write period ($t_{AW}$), the read operation from the random access memory 15, the arithmetic operation, and the write operation are not effected. In the read periods ($t_{R1}$, $t_{R2}$, $t_{R3}$), the same read operation as the above description is effected. In conclusion, the two kinds of the artithmetic operations are not effected, but video signals respectively scan-converted for a plurality of different regions are simultaneously available.

Although, in the above embodiment, a radar signal is processed with the digital scan converter of the present invention, other signals, if subjected to polar coordinate scanning, can be likewise processed. In addition, signals except the polar coordinate scanning, for example, random scan signals can be processed with the digital scan converter according to the present invention.

Although certain embodiments have been shown and described, it should be understood that many changes and modifications may be made therein without departing from the scope of the appended claims.

What is claimed is:

1. A digital scan converter for converting a video signal provided at a specific scan rate to a video signal scanned at a different scan rate comprising:
   (a) an analog-to-digital converter for converting an input video signal to digital data;
   (b) an input buffer for receiving and storing said digital data from said analog-to-digital converter;
   (c) a random access memory for receiving said stored digital data from said input buffer and for allowing said data to be written therein;
   (d) a write address generator for generating an address which designates a digital data write position and for inputting said address to said random access memory;
   (e) a plurality of read address generators for generating an address for reading digital data written in a desired region of said random access memory;
   (f) an address switch circuit composed of a first switch means for switching addresses from said write address generator and said plurality of read address generators and for delivering said addresses via an address signal line to said random access memory, and alternately switching a first signal line for transmitting an address from said write address generator and a common signal line for commonly transmitting addresses from said plurality of said read address generators to connect one of said switched lines with said address signal line, and composed of a second switch means for switching in succession a connection between the common signal line and a plurality of second signal lines respectively connected to said plurality of read address generators for transmitting addresses in which switch operation of said second switch means is effected during a connection between said first signal line and said address signal line by said first switch means;

(g) a plurality of output buffers respectively corresponding to said plurality of said read address generators for receiving and storing digital data read out of said random access memory;

(h) an output switch circuit having a third switch means cooperating with said second switch means for switching the connection between said first data line for transmitting digital data from said random access memory and said plurality of said second data lines for transmitting digital data to said plurality of output buffers, said output switch circuit being adapted to receive digital data from said random access memory and to switch connections from said output switch circuit to said plurality of output buffers; and (i) a plurality of digital-to-analog converters respectively provided for said plurality of said output buffers for receiving digital data from said output buffers and for converting said received digital data to analog video signals for their deliveries.

2. A digital scan converter according to claim 1, wherein said write address generator includes means for generating an address from azimuthal data and offcenter data.

3. A digital scan converter according to claim 1, further including a synch signal generator which receives a timing signal from said read address generators to generate a synch signal.

4. A digital scan converter according to claim 1 further including; a sweep correlator which receives digital data from said analog-to-digital converter and delivers sweep-correlated digital data to said input buffer.

5. A digital scan converter according to claim 1, wherein said input buffer comprises two line memories.

6. A digital scan converter for converting a video signal received at a specific scanning rate to a video signal having a different scan rate, comprising:

(a) an analog-to-digital converter for converting said received video signal to digital data;

(b) an input buffer for receiving and storing said digital data from said analog-to-digital converter;

(c) an input arithmetic circuit for receiving said stored digital data from said input buffer and for operating on said digital data;

(d) a random access memory for receiving said operated or digital data from said input arithmetic circuit and for allowing said digital data to be written therein;

(e) a write address generator for generating an address for providing a digital data write position and for inputting said address to said random access memory;

(f) an afterglow generator for generating an address to afterglow-process digital data written in a desired region of said random access memory;

(g) a plurality of read address generators for generating an address for reading out digital data written in a desired region of said random access memory;

(h) an address switch circuit for switching an address from said write address generator, said afterglow address generator, and said read address generators and for providing said addresses to said random access memory via an address signal line, said switch circuit having a first switch means for alternately switching a first signal line for transmitting an address from said write address generator and a common signal line for commonly delivering an address from said afterglow address generator and said plurality of said read address generators for connection with said address signal line and a second switch means for successively switching a connection between a plurality of second signal lines respectively connected to said afterglow address generator and said plurality of said read address generators for delivering addresses and said common signal line wherein a switching operation of said second switch means is effected while said first switch means connects said first signal line to said address signal line;

(i) a plurality of output buffers respectively corresponding to said plurality of said read address generators for receiving and storing therein digital data from said random acess memory;

(j) an output switch circuit having a fourth switch means which is operated so as to cooperate with said first switch means for receiving digital data from said random access memory and for switching a connection of said received signal between said input arithmetic circuit and said plurality of output buffers, and for alternately switching a third data line for transferring digital data to said input arithmetic circuit and a common data line for commonly delivering digital data to said input arithmetic circuit and said plurality of the outer buffers for connection to said first data line to transfer digital data from said random access memory, and a third switch means cooperating with said second switch means for successively switching said common data line to said third data line for supplying digital data to said input arithmetic circuit and a plurality of second data lines for supplying digital data to said output buffers for connection thereof; and (k) a plurality of digital-to-analog converter means respectively provided for said plurality of the output buffers for receiving digital data and converting said received data to an analog video signal.

7. A digital scan converter according to claim 6 wherein said write address generator includes plan for generating an address from azimuthal data and off-center data.

8. A digital scan converter according to claim 6 further including a synch signal generator for receiving a timing signal from said read address generators to generate a synch signal.

9. A digital scan converter according to claim 6 further including a sweep correlator for receiving digital data from said analog-to-digital converter and for transmitting digital data subjected to sweep correlation processing to said input buffer.

10. A digital scan converter according to claim 6 wherein said input buffer comprises two line memories.

* * * * *